United States Patent [19]

Christensen et al.

[11] 4,429,790
[45] Feb. 7, 1984

[54] LATCH AND HANDLE ASSEMBLY FOR MAGNETIC RECORDING DISC CARTRIDGE

[75] Inventors: Dean L. Christensen, Costa Mesa; Frank S. Ebey, Lakewood, both of Calif.

[73] Assignee: Memorex Corporation, Santa Clara, Calif.

[21] Appl. No.: 282,521

[22] Filed: Jul. 13, 1981

[51] Int. Cl.³ .................... G11B 23/02; A45C 13/26
[52] U.S. Cl. ..................................... 206/444; 360/97; 360/133; 206/1.5
[58] Field of Search ............... 206/444, 1.5, 303, 404, 206/405; 360/97, 133; 292/323, 332, 333

[56] References Cited

U.S. PATENT DOCUMENTS

| | | | |
|---|---|---|---|
| 2,001,443 | 5/1935 | Williams | 292/333 |
| 4,090,609 | 5/1978 | Rager | 206/444 |
| 4,235,339 | 11/1980 | Christensen et al. | 206/444 |
| 4,335,816 | 6/1982 | Rager | 206/444 |
| 4,336,631 | 6/1982 | Duff et al. | 206/444 X |
| 4,355,340 | 10/1982 | Butz | 360/133 |

Primary Examiner—William T. Dixson, Jr.
Assistant Examiner—Bryon Gehman
Attorney, Agent, or Firm—John J. McCormack; Nathan Cass; David W. Heid

[57] ABSTRACT

In a magnetic recording disc cartridge having a recording disc contained within an upper housing and a separably mating lower housing, an improved latch and handle assembly includes a lift assembly means attached to a handle assembly which is pivotally mounted to the upper housing. The handle assembly has a cavity, a pair of spring bias means within the cavity, and an urging means adapted to urge against the spring bias means in a direction substantially perpendicular to the pivot axis and to retain the spring bias means in the cavity. The spring bias means are adapted to move from a first position wherein the handle assembly is adapted to receive the lift assembly means, to a second position wherein the spring bias means is adapted to capture the lift assembly means.

6 Claims, 6 Drawing Figures

LATCH AND HANDLE ASSEMBLY FOR MAGNETIC RECORDING DISC CARTRIDGE

BACKGROUND OF THE INVENTION

In the field of data processing equipment, magnetic recording discs have long been used for providing readily accessible external data storage. Such discs conventionally have been used with suitable drive and recording apparatus and are frequently made readily removable from such apparatus. To provide for accurate, high-density recording of data on such recording discs, it has generally been found necessary to provide recording and reading heads extending inwardly of the periphery of the disc and spaced a very few thousandths of an inch above the surface of the disc. Because of this close head-to-disc spacing it is necessary that the surface of the disc be maintained essentially free of external contaminants such as dust and dirt. The presence of even tiny dust or dirt particles on the surface of the disc could result in interference between the dust particles and the disc and the recording head, thus resulting in what is commonly known as "head crash." Such an undesirable condition could result either in damage to the recording head or in distortion of the data recorded or read.

To maintain the surfaces of these magnetic recording discs substantially free from such contaminants when the discs are removed from the drive apparatus, as when they are stored, it has been conventional to enclose the discs in cartridges which substantially exclude such contaminants when the disc is removed from its drive. With certain types of cartridges a small access door is openable to permit access by the recording and playback heads to the disc surface. In other units such as that commonly known as a Memorex type 5440 disc cartridge the disc is contained within an upper housing which stays with the disc at all times. With this 5440 type cartridge the upper housing and the disc contained therewithin may be received within a separately mating lower housing which, with the upper housing, forms a substantially dust-tight enclosure. With this arrangement the upper housing and disc are mated with the lower housing as soon as the disc and upper housing are removed from the drive, thus protecting the disc surfaces.

In the 5440 type cartridge the lower housing is held securely to the disc and upper housing by engagement by magnets mounted to the lower housing with the steel hub of the disc contained in the upper housing. Separation of the upper and lower housings is effected by axial movement of the disc and its hub away from contact with those magnets.

Heretofore, this axial movement has been provided by a lifting arrangement associated with a handle assembly which is pivotally connected to the upper housing. The handle assembly also serves as a carrying assembly for the entire disc cartridge. Such an arrangement is shown in U.S. Pat. No. 4,235,339. It has been found, however, that this dual feature, i.e., the handle assembly serving as a latch assembly as well as a carrying assembly, is not normally used in its fullest extent. Normally, the operator does not carry the disc cartridge by the handle assembly. Rather, the operator simply grasps the sides of the cartridge while in the carrying mode. Thus, the prior art feature of the handle assembly serving both as a latch as well as a carrying assembly is not optimally utilized. In fact, the handle assembly merely needs to serve only as a latch assembly.

U.S. Pat. Nos. 4,071,862 and 3,917,068 disclose a handle assembly that serves only as a latching function. These references disclosed only the handle adapted to pivot about an axis in order to effect the latching or unlatching operation.

SUMMARY OF THE INVENTION

In view of the complexity and of the expense of a handle assembly that serves both as a carrying and latch arrangement for separating the disc and upper housing of a cartridge from the lower housing in the prior art structure, therefore, in accordance with the present invention, an improved latch assembly is provided which is far simpler and less expensive to manufacture and to assemble. The invention contemplates a handle assembly which is adapted to move about a pivot axis with the movement being between a first position substantially parallel to the surface of the disc and to a second position substantially perpendicular to the plane of the disc and generally parallel to the disc axis. The handle assembly has a cavity, a pair of spring bias means, and an urging means. The pair of spring bias means are in the cavity and are adapted to capture a lift assembly means and to move in a direction substantially parallel to the pivot axis. The urging means is adapted to urge against the spring bias means in a direction substantially perpendicular to the pivot axis and to retain the spring bias means in the cavity.

DETAILED DESCRIPTION OF THE INVENTION

Figure 1:
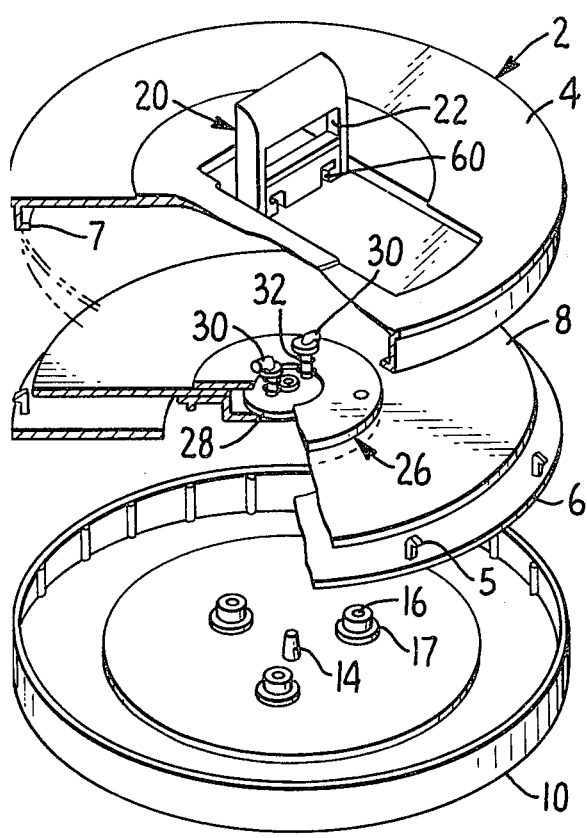
FIG. 1 is an exploded perspective view of the magnetic disc cartridge with which the present invention is associated.

Referring to FIG. 1, there is shown the basic components of a disc cartridge involved in the present invention, which is substantially similar to the well known type 5440 cartridge, except for the handle and latching arrangement. The basic components include the upper housing 2 with its formed cover 4 and bottom plate 6, magnetic recording disc 8 and formed lower housing 10. The bottom plate 6 is attached to the upper housing cover 4 by a plurality of snap retaining catches 5 molded into the plate 6, which snap over a lip 7 in the cover 4, with the disc 8 contained therein. Pivotally attached to the upper housing 4 is the handle and latch assembly 20. Mounted to or formed integrally with the lower housing 10 is disc centering post 14. Additionally, a plurality of magnets 16 are also mounted in bosses 17 attached to or formed with the lower housing 10, for purposes to be described below.

Figure 2:
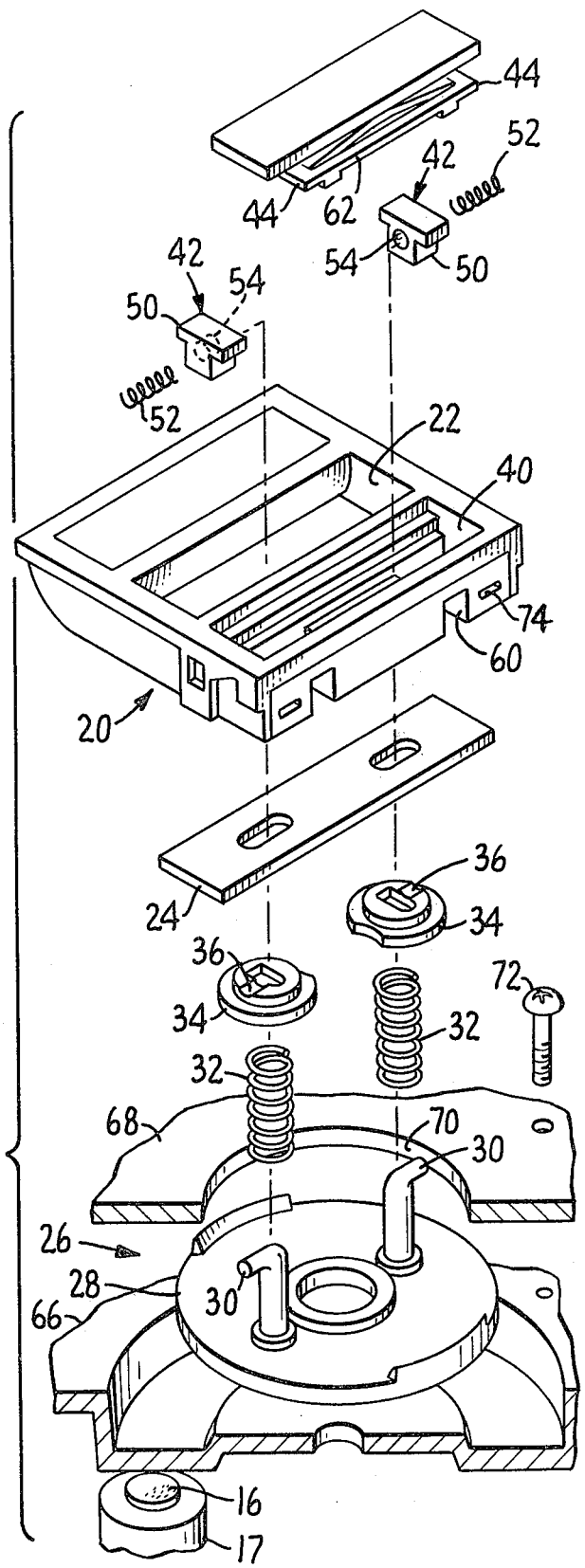
FIG. 2 is an exploded perspective view of one embodiment of the latch and handle assembly of the present invention.

In the exploded view of FIG. 2 are illustrated the functional components of the preferred embodiment of the latch and handle assembly 20 of the present invention. These components include basically, the handle assembly 22, a thin, elongated low friction pad 24, suitably of a synthetic resin such as that known as Delrin, and a lift assembly 26. The friction pad 24 and the lift assembly 26 are well known in the art and they are described in U.S. Pat. No. 4,235,339. The lift assembly 26 comprises a circular, disc-like lift plate 28 for contacting parts of the hub of the recording disc 8, and also at least one, and in this embodiment two, connecting posts 30 extending upwardly from the lift plate 28. These connecting posts 30 in this embodiment preferably are generally L-shaped, and the entire lift assembly 26 is suitably formed as a unitary member out of a suitable synthetic resin. The lift plate 28 is received within a hollow area formed in the hub of the disc 8, suitably defined by lower hub portion 66 and upper hub portion 68. Concentric with the disc in the upper portion 68 there is provided an aperture 70, suitably circular in configuration and dimensioned to be smaller than the diameter of the lift plate 28 of the lift assembly 26, but larger in diameter than the spacing of the two connecting posts 30 so that those posts 30 may project freely through the aperture 70. When the upper hub portion 68 is attached to the lower hub portion 66, suitably by threaded fastener 72, the lift plate 28 in the hollow area between the two disc hub portions 66 and 68 is loosely captured within that hollow area and cannot be removed.

Fitting over each of the posts 30 are compression springs 32 and spring retainers 34. The disc-like spring retainers 34 have slots through the center, dimensioned to slip over the radially outwardly projecting extremities of the posts 30 when the slots are aligned with those extremities, but being captured on those posts 30 when the spring retaining discs 34 are rotated to another position, such as that illustrated in FIG. 2. In that rotated position the small hollows 36 will engage the radially outwardly facing extremities of the posts 30 and, thus, serve to retain the springs 32, suitably slightly, compressed on the posts 30 during assembly. Here, again, the entire lift plate 28, the springs 32, the retaining discs 34 and the posts 30 form the lift assembly 26 and is well known in the art and is fully described and disclosed in U.S. Pat. No. 4,235,339.

Figure 5A:
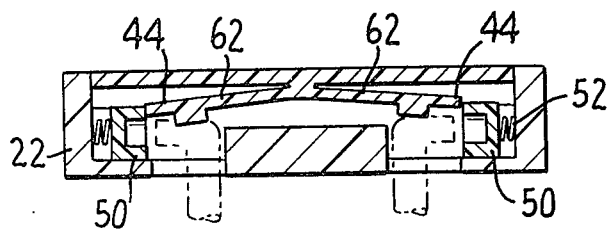
FIG. 5(a-b) are fragmentary plan views of a portion of the one embodiment of the latch and handle assembly of the present invention, prior to full assembly with the lift assembly means (5a) and after assembly (5b).

The handle assembly 18 which forms a part of the latch and handle assembly 20 of the present invention comprises a substantially rectangularly shaped cavity 40, a pair of spring bias means 42, within said cavity 40, and an urging means 44. Each of the pair of spring bias means 42 is comprised of a slide member 50 and a spring 52. Each slide member 50 has a hole 54 at one end thereof with the spring 52 located at an end opposite said one end. The hole 54 is adapted to receive the posts 30. The spring bias means 42 are located at opposite ends within the cavity 40 with the spring 52 urged against the end of the cavity 40. The cavity 40 has a pair of slots 60 through which the handle assembly 22 is adapted to receive the posts 30. With the posts 30 inserted through the slot 60, the posts 30 are fitted into the hole 54 of each of the slide member 50. The handle assembly 22 is adapted to pivot between a first position substantially parallel to the disc and a second position substantially perpendicular to the plane of the disc and generally parallel to the disc axis. The urging means 44 is adapted to urge against the spring bias means 42 in the direction substantially perpendicular to the pivot axis and to retain the spring bias means 42 within the cavity 40. The spring 52 of the spring bias means 22 causes the slide member 50 to move in a direction substantially parallel to the pivot axis of the handle assembly 22. The spring bias means 50 is moveable from a first position to a second position. These are shown substantially in FIGS. 5a and 5b. When the spring bias means 42 is in the first position (as shown in FIG. 5a), the handle assembly 22 is adapted to receive the posts 30 through the slots 60. When the spring bias means 42 is in the second position, as shown in FIG. 5b, the spring bias means 42 is adapted to capture the posts 30.

Figure 5B:
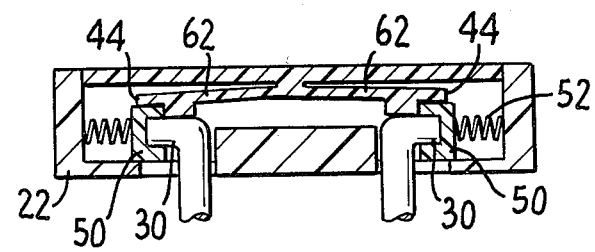

The urging means 44 is also adapted to move from a first position to a second position, as shown in FIGS. 5a and 5b. With the urging means 44 in its first position, as shown in FIG. 5a, the spring bias means 42 is held in its first position. The urging means 44 has a pair of outer flanges 62 each of which when it is in its first position, prevents the spring bias means 42 from moving into its second position. When the flanges 62 are retracted, i.e., the urging means 44 is in its second position, the spring bias means 42 is urged by the spring 52 to move to its second position to capture the posts 30.

The assembly of the latch and handle assembly of the present invention is quite simple. The lift assembly means 26 may be preassembled using the lift plate 28, the spring 32 and the spring retainer 34 as that described in U.S. Pat. No. 4,235,339. The handle assembly 22 also has a pair of slits 74. Each slit 74 is adapted to receive an instrument to move the spring bias means 42 from its second position as that shown in FIG. 5b, to its first position, as that shown in FIG. 5a. With the spring bias means 42 moved into its first position, the flange 62 of the urging means 44 will automatically lower (caused by the spring action of the urging means 44) preventing the spring bias means 42 from moving back into its second position. Thus, an instrument may be inserted through the slits 74 to move the spring bias means 42 into its first position, in that position as substantially shown in FIG. 5a. The posts 30 are then inserted through the slots 60. Upon insertion, the posts 30 impinge the flanges 62 raising the flanges 62 to their upper position thereby automatically permitting the spring 52 of each spring bias means 42 to move the slide member 50 into its second position. This automatically captures the posts 30 within the cavity 40 of the handle assembly 18. All of the components of the cartridge except the disc, its hub and the springs are formed of a suitable synthetic resin. From the foregoing description, this unique simple and rapid manner of assembly may be seen.

Figure 3:
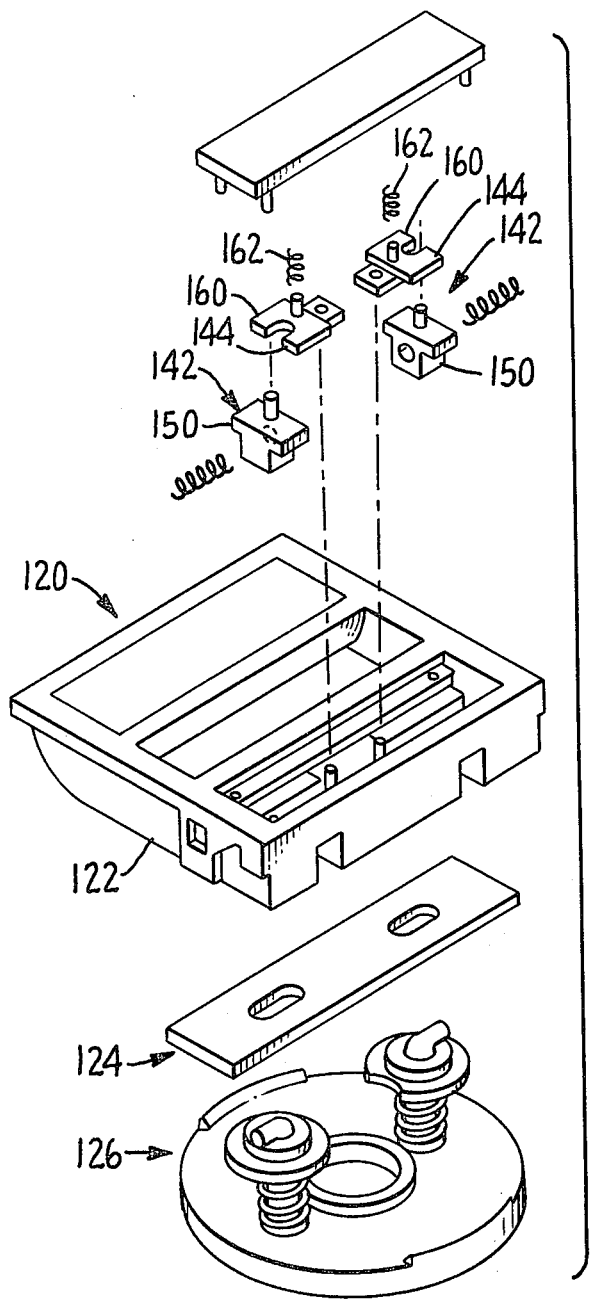
FIG. 3 is an exploded perspective view of another embodiment of the latch and handle assembly of the present invention.
Figure 4:
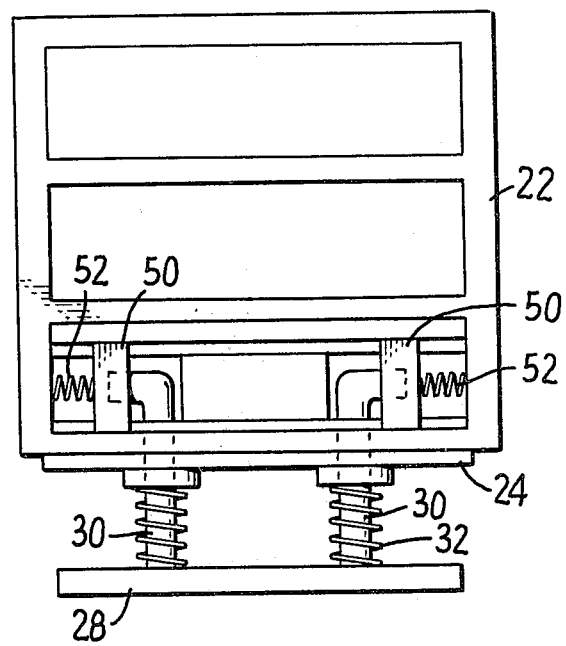
FIG. 4 is a fragmentary plan view of the one embodiment of the latch and handle assembly of the present invention in its unlatching operation.

Referring to FIG. 3, there is shown another embodiment of the latch and handle assembly 120 of the present invention. The latch and handle assembly 120 as shown in FIG. 3 comprises the lift assembly means 126, the slip plate 124, and the handle assembly 122 as previously described. The only difference between the embodiment shown in FIG. 3 from that shown in FIG. 2 is the urging means 144. In the embodiment shown in FIG. 3, the urging means 144, instead of being a single member with two outwardly extending flanges 62, comprises two identical portions. Each portion of the urging means 144 comprises a cap member 160 and a spring 162. The spring 162 is connected to the cap 160 and is adapted to move it in the direction substantially perpendicular to the direction of motion of the spring bias means 142. The cap member 160 is substantially adjacent to the slide member 150 of the spring bias means 142. Here, again, similar to the operation of the urging means 44 shown in FIG. 2, the urging means 144 is adapted to move from a first position to a second position. In its first position, the spring 162 is fully extended and, thus, the cap member 160 prevents the slide member 150 from moving into its second position. Upon insertion of the posts 30 through the slots 60, the posts 30 automatically impinge the cap member 160 pushing it upward compressing the spring 162 thereby permitting the slide member 150 to slide freely into its second position and to capture the posts 30. It is clear from the foregoing that the embodiment shown in FIG. 2 is preferred since the urging means 44 is of unitary construction and may be all made out of a single piece comprising of a synthetic resin.

There are many advantages to the latching assembly of the present invention. Because the latch assembly is only capable of performing the function of latching and not the additional task of carrying the disc cartridge, the number of parts required to manufacture and to assemble the latching and handle assembly is greatly reduced. This has caused a great reduction in the cost of the manufacturing of the latch and handle assembly. In addition, with fewer parts, the reliability is increased. Moreover, the assembly is stable, and weight savings are also achieved. Accordingly, the scope of this invention is to be defined not by the foregoing illustrative description but by the claims appended hereto.

What is claimed is:

1. In a magnetic recording cartridge having a recording disc contained within a first housing, with a second separably-mating housing whereby separation of said second housing is effected by lifting said recording disc axially away from engagement with a portion of said second housing which extends transversely of the disc axis;

an improved latch-handle assembly combined therewith, this assembly comprising:

lift means comprising a pair of L-shaped posts and a lift plate; and grip means adapted to move about a pivot axis, said movement being between a first position substantially parallel to said disc and a second position relatively normal to the first position, being substantially perpendicular to the plane of said disc and generally parallel to said disc axis;

this grip means including a cavity with a pair of slots adapted to receive said lift means, a pair of spring bias means and an urging means, the urging means being adapted to move from a first position to a second position, whereby in said first position the spring bias means is held in "disengaged" condition and whereby in said second position it facilitates release of said spring bias means to be spring-urged into "engaged" condition whereat to capture said lift means;

said pair of spring bias means being thus adapted to be spring-urged from said "disengaged" to said "engaged" condition and so adapted to so capture said lift means; and said spring bias means being located at opposite means of said cavity and each of said bias means comprises a slide member having a hole at one end thereof and a spring at an end opposite said one end; said hole adapted to receive said L-shaped post, said spring is urged against the end of said cavity; and wherein, in said first position, said grip means is adapted to receive said lift means through said slots;

said urging means being adapted to so urge said spring bias means to said "engaged" condition, and in a direction substantially perpendicular to said pivot axis, as well as being adapted to retain said spring bias means in said cavity.

2. The latch and handle assembly of claim 1 wherein said urging means is adapted to move to its second position upon insertion of said L-shaped posts into said cavity during the assembly of said latch assembly thereby causing each of said spring bias means to move to a respective "open" condition so as to capture said posts.

3. The latch and handle assembly of claim 2 wherein said handle assembly further comprises two slits, each slit is adapted to receive an instrument to move each of said spring bias means to its "closed" condition.

4. The latch and handle assembly of claim 3 wherein said urging means comprises a pair of cap members and a pair of springs; each cap member attached to a spring and is substantially adjacent to a spring bias means.

5. The latch and handle assembly of claim 3 wherein said urging means comprises a single cap lift bar member with two resiliently attached biased flanges.

6. The latch and handle assembly of claim 4 or 5 wherein said lift assembly means, said handle assembly, said cap lift bar member and said slide members are all formed of synthetic resin.

* * * * *